Jan. 8, 1924. 1,479,784
C. M. BOSWORTH ET AL
THERMOSTATIC CONTROL DEVICE
Filed Aug. 23, 1920
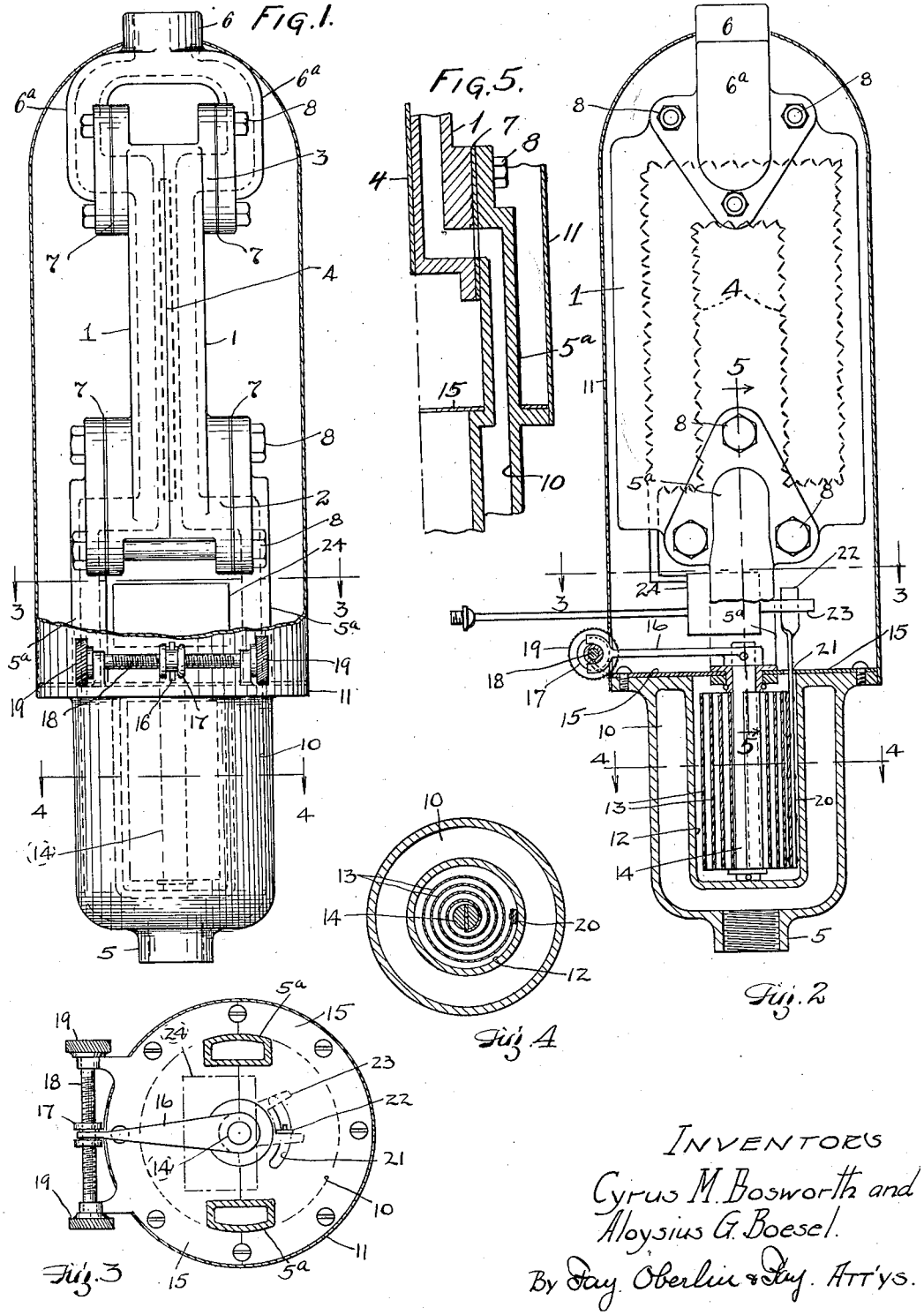
INVENTORS
Cyrus M. Bosworth and
Aloysius G. Boesel.
By Fay, Oberlin & Fay. Att'ys.

Patented Jan. 8, 1924.

1,479,784

UNITED STATES PATENT OFFICE.

CYRUS M. BOSWORTH, OF LAKEWOOD, AND ALOYSIUS G. BOESEL, OF CLEVELAND HEIGHTS, OHIO.

THERMOSTATIC CONTROL DEVICE.

Application filed August 23, 1920. Serial No. 405,530.

*To all whom it may concern:*

Be it known that we, CYRUS M. BOSWORTH and ALOYSIUS G. BOESEL, both citizens of the United States, and residents of Lakewood, county of Cuyahoga, and State of Ohio, and of Cleveland Heights, county of Cuyahoga, and State of Ohio, respectively, have jointly invented a new and useful Improvement in Thermostatic Control Devices, of which the following is a specification, the principle of the invention being herein explained and the best mode in which we have contemplated applying that principle, so as to distinguish it from other inventions.

Our present improved thermostatic control device is designed more particularly to satisfy the conditions encountered in connection with electric water heaters, where the electric current requires to be turned on and shut off as the temperature of the water passing through the heater changes. In view of the damage that may result to the heating resistance coils, and to other parts of the apparatus if too high a temperature is produced, the necessity for prompt and accurate thermostatic regulation will be evident. It of course is not intended to limit the field of use of our invention to such electric water heaters alone, but such device may be employed in any situation where the temperature of a liquid or fluid of any sort constitutes the basis of control.

To the accomplishment of the foregoing and related ends, our invention, then, consists of the means hereinafter fully described and particularly pointed out in the claims, the annexed drawing and the following description setting forth in detail certain mechanism embodying the invention, such disclosed means constituting, however, but one of various mechanical forms in which the principle of the invention may be used.

In said annexed drawing:—

Fig. 1 is a side elevation of an electric heater of novel design, showing our improved thermostatic control device in association therewith; Fig. 2 is a view similar to that of Fig. 1, but taken at right angles thereto and with the thermostatic control device shown in central section; Fig. 3 is a transverse section, the plane of the section being indicated by the line 3—3, Figs. 1 and 2; Fig. 4 is likewise a transverse section, but taken on the plane indicated by the line 4—4, Figs. 1 and 2; and Fig. 5 is a section of a detail, the plane of the section being at right angles to that of Fig. 2, as indicated by the line 5—5 thereon.

The construction of the water heater proper forms the subject matter of our separate co-pending application filed February 7, 1920, Serial No. 356,896 (such application having since issued into Patent No. 1,375,357, dated April 19, 1921), and such construction is only described in the present connection in order to explain the manner in which the thermostatic control device is attached. Said heater will be seen to comprise two similar water-containing and heating members, in the form of flat, hollow bodies 1. As shown in Fig. 2, the shape of these bodies in side elevation is preferably vertically oblong, with rounded corners, said bodies being formed, adjacent their respective ends, with water inlet and outlet openings 2 and 3 that are located in the outwardly disposed flat faces of the bodies when they are brought together with their other flat faces in juxtaposition, as shown in Fig. 1. A suitable heating electrical resistance element 4 is interposed and tightly clamped between such juxtaposed flat faces which are recessed as at 30, so as to be in practically air-tight contact therewith. Branched connections 5 and 6 are fitted over the respective ends of the assembled bodies, so that free communication may be had through their respective branches 5ª 5ª and 6ª 6ª with the interiors of said bodies, the result being that water entering through connection 5 divides in its flow, part passing through one body and part through the other, and is then collected and discharged through connection 6. The arms or branches of said connections 5 and 6 have their inner faces machined to tightly fit over the corresponding ends of the bodies, suitable gaskets 7 being interposed to insure a water-tight joint. When in place, set screws 8 serve to secure said branches or arms, and thus the corresponding connections 5 and 6, firmly to the assembled heating units or hollow bodies 1.

The inlet connection 5, before branching to form arms 5ª, is enlarged to provide an annular chamber 10, as best shown in Fig. 4, the branches or arms 5ª rising from the flanged cover 11 of this chamber, as best shown in Fig. 3. There is thus formed by the inner wall of said annular chamber 10 a central circular chamber or well 12, which is filled with oil or equivalent liquid, and is adapted to receive the active element or coil 13 of the thermostatic device of present interest. This coil in itself is of familiar construction, consisting of two thin sheets of metal, having different coefficients of expansion, welded with their flat faces together so as to form one single strip or sheet which is then wound in the form of a spiral. The inner end of the spiral strip is firmly attached to a spindle 14 journaled at its upper end in a plate 15 attached to flanged cover 11, and having a radially projecting arm 16, as shown in Figs. 2 and 3, the outer end of which engages a traverse nut 17 on an adjusting screw 18. Accordingly, by simply turning said screw 18 through the medium of knurled heads 19 on the ends thereof in one direction or the other, the angular position of the spindle 14, and thus the setting of the thermostat coil 13, may be adjusted as desired.

Firmly attached to the outer or free end of coil 13 is a vertical bar 20, the upper end of which projects through a slot 21 in plate 15, and is formed into a finger 22 that is adapted to engage with a forked switch lever 23 (best shown in Fig. 3), such lever projecting radially from the switch box 24 that is mounted between the branches 5ª directly below the heater units 1. The electrical connections (not shown) for such units, it will be understood, pass through this switch box, so that the current is thrown on when lever 23 is swung to one side and is cut off when said lever is thrown to the other side, the action of the lever being of the quick make and break type. In other words, the thermostat coil 13 will have to expand or contract a predetermined amount before it is effective to operate the switch lever in either direction, but such operation is then practically instantaneous.

It will be observed that the well 12 in which the coil 13 is mounted, and similarly such coil itself, is of greater length axially than wide in a diametral direction; preferably such length or height of the coil is several times its diameter. As a result of this dimensional relationship, and the vertical disposition of the coil, the latter we find is much more rapid in its action than in any construction of thermostat with which we are familiar. This rapidity of action is evidently due to the better circulation of the oil which surrounds the coil, such circulation being set up and maintained, due to the heating of the layer of oil in contact with the external wall of the well. Also due to the vertical disposition of the coil, the latter interposes a minimum of resistance to such circulation, while by making it high relative to its diameter, the circulation or velocity of the oil is increased, just as the draft is increased by increasing the height of a chimney. Another important advantage in making the coil small in diameter compared with its length lies in the increased ratio of the radiating surface to the volume of the metal in the coil and surrounding liquid. The rapidity of action is dependent on this ratio, i. e. upon the rapidity of heating or cooling the element, and since the volume of a cylinder is proportional to the square of the diameter, and directly proportional to the length, while the radiating surface on the curved portion (the only surface we are concerned with) is directly proportional to the diameter and the length, the ratio of the volume to radiating surface thus being independent of the length, the ratio of such radiating surface to the volume in any cylinder is indirectly proportional to the square of the diameter. A thin wide ribbon wound into a coil of as small diameter, consistent with the practical conditions, as will give the necessary strength and deflection, hence constitutes the ideal construction.

It may be found desirable, in certain situations, to have the thermostat located so as to respond to the temperature of the water as it leaves the heater, instead of as it enters the same. It has not been thought necessary to illustrate this modification, since the only arrangement of parts involved will be the reversal, top for bottom, of the apparatus as shown in Figs. 1 and 2.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:—

1. In a device of the class described, the combination of a liquid connection including an annular chamber having branches rising therefrom and a central well adapted to contain a permanent body of liquid, a spindle vertically mounted in said well, a thermo-sensitive element consisting of a sheet-metal coil attached at its inner end to said spindle, and a bar attached to the outer end of said coil, one such end of said coil being normally held stationary and the other being free to move.

2. In a device of the class described, the combination of a liquid connection including an annular chamber having branches rising therefrom and a central well adapted to contain a permanent body of liquid, a spindle vertically mounted in said well, means adapted to retain said spindle in various angular positions about its axis, a thermo-sensitive element consisting of a sheet-metal coil attached at its inner end to said spindle, and a bar attached to the outer end of said coil, one such end of said coil being normally held stationary and the other being free to move.

3. In a device of the class described, the combination of a liquid connection including an annular chamber having branches rising therefrom and a central well adapted to contain a permanent body of liquid, a spindle vertically mounted in said well, a cover for said well, a spindle vertically mounted in said well and having its upper end journaled in said cover, a radial arm attached to such upper spindle end, means for adjustably holding the free end of said arm, a thermo-sensitive element consisting of a sheet-metal coil attached to its inner end to said spindle, and a bar attached to the outer end of said coil, such outer end and bar being free to move as said coil contracts and expands.

4. In a device of the class described, the combination of a suitable chamber having a well adapted to contain a body of liquid, a spindle vertically mounted in said well, a thermo-sensitive element consisting of a sheet-metal coil attached at its inner end to said spindle, and a bar attached to the outer end of said coil, one such end of said coil being normally held stationary and the other being free to move, the length of said coil axially being greater than its width.

5. In a device of the class described, the combination of a suitable chamber adapted to contain a body of liquid, a spindle vertically mounted therein, means adapted to retain said spindle in various angular positions about its axis, a thermo-sensitive element consisting of a sheet-metal coil attached to its inner end to said spindle, and a bar attached to the outer end of said coil, such outer end and bar being free to move as said coil contracts and expands, the length of said coil axially being greater than its width to aid in causing circulation of the liquid about said coil.

Signed by us, this 20 day of August, 1920.

CYRUS M. BOSWORTH.
ALOYSIUS G. BOESEL.